US010454680B2

United States Patent
Tu et al.

(10) Patent No.: US 10,454,680 B2
(45) Date of Patent: Oct. 22, 2019

(54) RSA DECRYPTION PROCESSOR AND METHOD FOR CONTROLLING RSA DECRYPTION PROCESSOR

(71) Applicant: BEIJING BAIDU NETCOM SCIENCE AND TECHNOLOGY CO., LTD., Beijing (CN)

(72) Inventors: Yichen Tu, Beijing (CN); Wei Qi, Beijing (CN); Yong Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 199 days.

(21) Appl. No.: 15/619,151

(22) Filed: Jun. 9, 2017

(65) Prior Publication Data

US 2018/0123792 A1    May 3, 2018

(30) Foreign Application Priority Data

Nov. 1, 2016    (CN) .......................... 2016 1 0936230

(51) Int. Cl.
    *H04L 9/00*    (2006.01)
    *H04L 9/30*    (2006.01)
    (Continued)

(52) U.S. Cl.
    CPC .................. *H04L 9/30* (2013.01); *G09C 1/00* (2013.01); *H04L 9/06* (2013.01); *H04L 9/0618* (2013.01); *H04L 9/302* (2013.01); *H04L 2209/12* (2013.01)

(58) Field of Classification Search
    CPC ... H04L 9/06; H04L 9/30; H04L 9/302; H04L 9/0618; H04L 2209/12
    See application file for complete search history.

(56) References Cited

U.S. PATENT DOCUMENTS

| 8,560,814 | B2 * | 10/2013 | Golla | G06F 9/3851 |
| | | | | 712/220 |
| 2003/0065696 | A1 * | 4/2003 | Ruehle | G06F 7/723 |
| | | | | 708/491 |
| 2005/0256920 | A1 * | 11/2005 | Crispin | G06F 7/728 |
| | | | | 708/491 |

FOREIGN PATENT DOCUMENTS

| CN | 101170406 A | 4/2008 |
| CN | 101594227 A | 12/2009 |
| (Continued) | | |

OTHER PUBLICATIONS

Lin (2015) "Crucial Technology Research on High Performance Parallel Multiplier." Master Dissertation, Xian University, pp. 11-12, Fig. 2.7.

(Continued)

*Primary Examiner* — Beemnet W Dada
(74) *Attorney, Agent, or Firm* — Lathrop Gage LLP (57) ABSTRACT

The present application discloses an RSA decryption processor and a method for controlling an RSA decryption processor. A specific implementation of the processor includes a memory, a control component, and a parallel processor. The memory is configured to store decryption parameters comprising a private key. The control component is configured to receive a ciphertext set, and send a decryption signal comprising the ciphertext set to the parallel processor. The parallel processor is configured to: read a decryption parameter from the memory in response to receiving the decryption signal, and use at least one modular exponentiation circuit unit in the parallel processor to perform in parallel a modular exponentiation operation on ciphertexts in the ciphertext set by using the read decryption parameter, to obtain plaintexts corresponding to the ciphertexts. This implementation improves the efficiency of RSA decryption.

13 Claims, 7 Drawing Sheets

(51) Int. Cl.
*H04L 9/06* (2006.01)
*G09C 1/00* (2006.01)

(56) References Cited

FOREIGN PATENT DOCUMENTS

| CN | 102411558 A | 4/2012 |
|----|-------------|--------|
| CN | 103294648 A | 9/2013 |

OTHER PUBLICATIONS

Luo et al. (2012) "Implementation of RSA Algorithm based on Multi-core Network Processor", Telecom Market, Chinese Telecommunication Information Security Conference (2012), 7 pp.

\* cited by examiner

RSA DECRYPTION PROCESSOR AND METHOD FOR CONTROLLING RSA DECRYPTION PROCESSOR

CROSS-REFERENCE TO RELATED APPLICATION

This application is related to and claims priority from Chinese Application No. 201610936230.8, filed on Nov. 1, 2016 and entitled "RSA Decryption Processor and Method for Controlling RSA Decryption Processor", the entire disclosure of which is hereby incorporated by reference.

TECHNICAL FIELD

The present application relates to the field of computer technology, specifically to the field of processor technology, and more specifically to an RSA decryption processor and a method for controlling an RSA decryption processor.

BACKGROUND

The RSA encryption algorithm is a public-key cryptosystem proposed by Rivest, Shamir, and Adleman. RSA is named from the initial letters of the surnames of Rivest, Shamir, and Adleman. It is considered to be theoretically the most mature and perfect cryptosystem so far. The RSA encryption algorithm is an asymmetric cryptographic algorithm. That is, the algorithm needs a pair of keys, namely, a public key (n, e) and a private key (n, d), where the public key (n, e) is used for encryption, and the private key (n, d) is used for decryption. The algorithm is as follows: setting A as a plaintext, and B as a ciphertext, the encryption equation is "$B=A^e \bmod n$", and the decryption equation is "$A=B^d \bmod n$", where "mod" represents a modular operation, that is, taking the remainder after dividing one integer by another integer, without considering the quotient. As an example, 7 mod 3=1: for 7 divided by 3, the quotient is 2 and the remainder is 1, and the remainder 1 is the result of the mod operation.

During RSA decryption, it is needed to obtain the ciphertext B and the private key (n, d), and perform a modular exponentiation operation by using $A=B^d \bmod n$ to obtain the plaintext A. However, the existing decryption method generally uses a general-purpose processor, such as a CPU, to perform RSA decryption, but one CPU core can only perform one RSA decryption operation task at a time. Thus, the RSA decryption efficiency is low.

SUMMARY

An objective of the present application is to provide an improved RSA decryption processor and method for controlling an RSA decryption processor, in order to solve the technical problem mentioned in the foregoing Background section.

According to a first aspect, the present application provides an RSA decryption processor. The RSA decryption processor comprises a memory, a control component, and a parallel processor. The memory is configured to store decryption parameters comprising a private key. The control component is configured to receive a ciphertext set, and send a decryption signal comprising the ciphertext set to the parallel processor. The parallel processor is configured to: read a decryption parameter from the memory in response to receiving the decryption signal, and use at least one modular exponentiation circuit unit in the parallel processor to perform in parallel a modular exponentiation operation on ciphertexts in the ciphertext set by using the read decryption parameter, to obtain plaintexts corresponding to the ciphertexts.

According to a second aspect, the present application provides a method for controlling an RSA decryption processor. The RSA decryption processor comprises a memory and a parallel processor, and the memory is configured to store decryption parameters comprising a private key. The method comprises: receiving a ciphertext set; and sending a decryption signal comprising the ciphertext set to the parallel processor, so that the parallel processor reads a decryption parameter from the memory in response to receiving the decryption signal, and uses at least one modular exponentiation circuit unit in the parallel processor to perform in parallel a modular exponentiation operation on ciphertexts in the ciphertext set by using the read decryption parameter, to obtain plaintexts corresponding to the ciphertexts.

According to the RSA decryption processor and the method for controlling the RSA decryption processor as provided in the present application, a plurality of modular exponentiation circuit units in a parallel processor are used to perform modular exponentiation operations on a plurality of ciphertexts in a ciphertext set in parallel, so that the parallelism of RSA decryption is increased, thereby improving the efficiency of RSA decryption.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
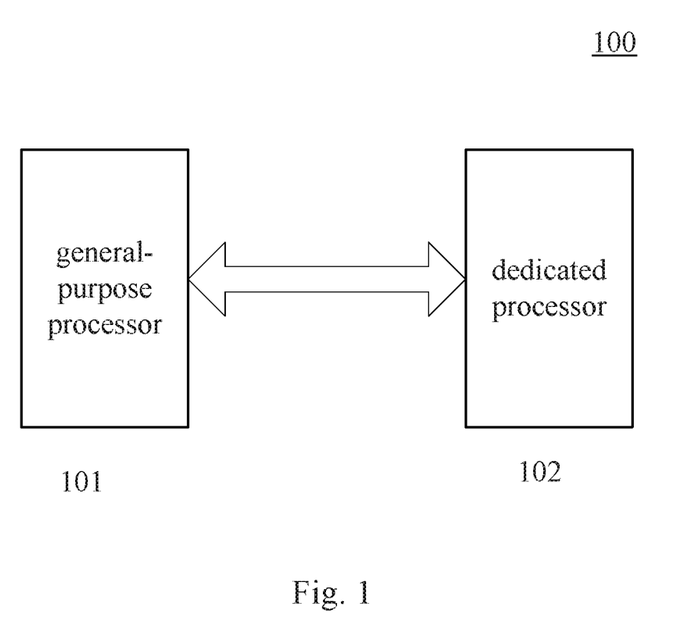
FIG. 1 is a diagram illustrating an exemplary system architecture to which the present application can be applied.

FIG. 1 illustrates an exemplary system architecture 100 to which a RSA decryption processor and a method for controlling an RSA decryption processor according to embodiments of the present application are applicable.

As shown in FIG. 1, the system architecture 100 may include a general-purpose processor 101 and a dedicated server 102.

The general-purpose processor 101 is configured to encrypt a plaintext by using a public key according to an RSA encryption algorithm to obtain a ciphertext, and send the ciphertext to the dedicated processor 102. The dedicated processor 102 may receive the ciphertext, and decrypt the received ciphertext by using a private key according to an RSA decryption algorithm, to obtain a plaintext corresponding to the ciphertext. The general-purpose processor 101 may also be referred to as a host, and the dedicated processor 102 may be designed from a Field-Programmable Gate Array (FPGA). The FPGA may include a calculation unit and a storage unit. The FPGA communicates with an electronic device including the above-mentioned general-purpose processor (for example, CPU) via a PCI-E interface. The FPGA may acquire the ciphertext from the general-purpose processor via the PCI-E interface.

It should be noted that the RSA decryption processor provided in embodiments of the present application generally refers to the dedicated processor 102 in FIG. 1, and correspondingly, the method for controlling an RSA decryption processor is generally performed by a control component in the dedicated processor 102.

It should be understood that the numbers of the general-purpose processor 101 and the dedicated processor 102 in FIG. 1 are merely schematic. There may be any number of general-purpose processors and any number of dedicated processors as required in practice.

Figure 2A:
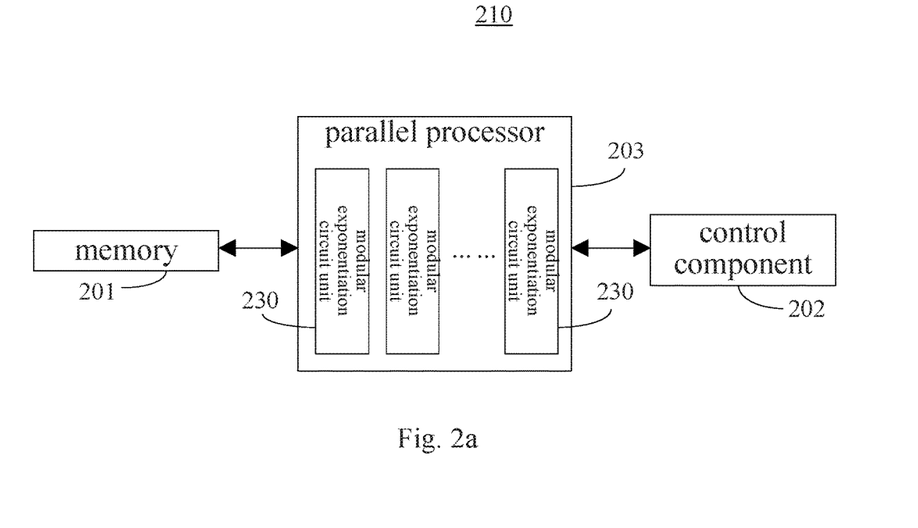
FIG. 2a is a schematic structural diagram of an RSA decryption processor according to an embodiment of the present application.

Referring to FIG. 2a, a schematic structural diagram of an RSA decryption processor 210 according to the present application is illustrated.

As shown in FIG. 2a, the above-mentioned processor 210 includes a memory 201, a control component 202, and a parallel processor 203.

In this embodiment, the memory 201 is configured to store decryption parameters. Herein, the decryption parameters may include a private key (n, d).

It should be understood by those skilled in the art that if a ciphertext B and the private key (n, d) have small bit widths, for example, the bit widths of the ciphertext B and the private key (n, d) are both less than 1024 bits, a modular exponentiation operation may be performed directly according to a decryption equation "$A=B^d \mod n$", to obtain a plaintext A.

In this embodiment, the control component 202 is configured to receive a ciphertext set, and send a decryption signal including the ciphertext set to the parallel processor.

In this embodiment, the control component 202 may receive a ciphertext from another electronic device (for example, the general-purpose processor in FIG. 1). The another electronic device may be any electronic device that encrypts the plaintext, or may be an electronic device that forwards the ciphertext. Herein, the ciphertext set received by the control component is a set including at least one ciphertext. After receiving the ciphertext set, the control component sends a decryption signal to the parallel processor, where the decryption signal includes the ciphertext set received by the control component.

In this embodiment, the parallel processor 203 is configured to: read a decryption parameter from the memory in response to receiving the decryption signal, and use at least one modular exponentiation circuit unit in the parallel processor to perform in parallel a modular exponentiation operation on ciphertexts in the ciphertext set by using the read decryption parameter, to obtain plaintexts corresponding to the ciphertexts.

In this embodiment, the decryption parameter read by the parallel processor includes a key.

A large number of identical processing elements (PEs) may be configured in the parallel processor. They are interconnected in a way to form an array, and are controlled by a single control part to perform in parallel a same operation on different data respectively allocated thereto. In this embodiment, a large number of identical modular exponentiation circuit units 230 may be configured in the parallel processor. Each modular exponentiation circuit unit separately perform a modular exponentiation operation on one ciphertext in the ciphertext set and the key, to obtain a plaintext through decryption.

According to the RSA decryption processor provided in this embodiment, multiple modular exponentiation circuit units in the parallel processor are used to simultaneously decrypt multiple ciphertexts in a ciphertext set, so that the parallelism of RSA decryption is increased, thereby improving the efficiency of RSA decryption.

Figure 2B:
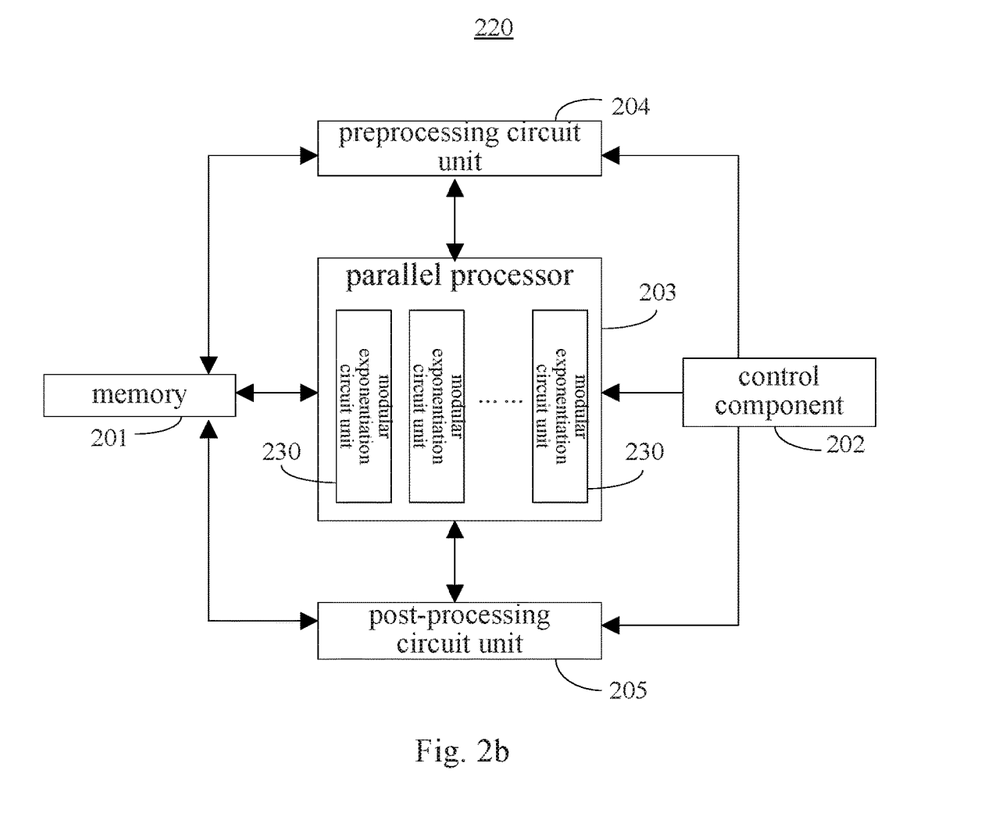
FIG. 2b is a schematic structural diagram of an RSA decryption processor according to another embodiment of the present application.

Referring to FIG. 2b, a schematic structural diagram of an RSA decryption processor 220 according to the present application is illustrated.

As shown in FIG. 2b, the RSA decryption processor 220 includes the memory 201, the control component 202, the parallel processor 203, a preprocessing circuit unit 204, and a post-processing circuit unit 205.

It should be understood by those skilled in the art that, if a ciphertext and a private key have large bit widths, for example, the bit width of the ciphertext is 2048 bits, performing a modular exponentiation operation on the ciphertext and the private key directly by using a decryption equation consumes a huge amount of computational resources. In this case, the ciphertext and the private key may be converted according to the Chinese remainder theorem, to obtain parameters with small bit widths, and a series of operations may be performed on the parameters with small bit widths, to obtain a plaintext.

Figure 3:
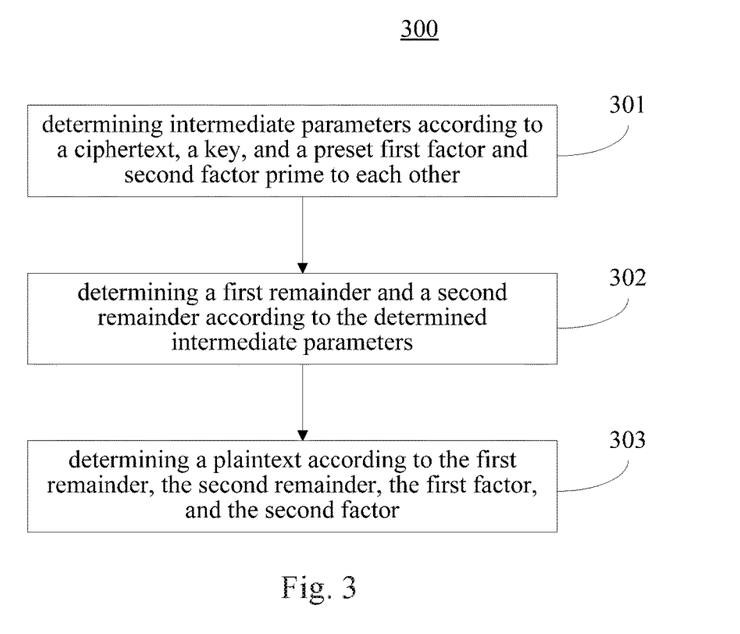
FIG. 3 is a flow chart of a computation process of RSA decryption performed according to the Chinese remainder theorem.

A specific computation process can be referred to the flow 300 shown in FIG. 3, which illustrates a computation process of RSA decryption performed according to the Chinese remainder theorem. FIG. 3 is briefly described as follows.

At step 301, intermediate parameters are determined according to a ciphertext c, a key (n, d), and a preset first factor p and second factor q that are mutually prime, the intermediate parameters including a first base $c_1$, a first exponent $d_p$, a second base $c_2$, and a second exponent $d_q$, where:

$$d_p = d \mod(p-1);$$

$$d_q = d \mod(q-1);$$

$$c_1 = c \mod p; \text{ and}$$

$$c_2 = c \mod q.$$

At step 302, a first remainder $m_1$ and a second remainder $m_2$ are determined according to the intermediate parameters determined at step 301, where:

$$m_1 = c_1^{dp} \bmod p; \text{ and}$$

$$m_2 = c^{dq} \bmod q.$$

At step 303, a plaintext m is determined according to the first remainder $m_1$, the second remainder $m_2$, the first factor p, and the second factor q, where:

$$q_{Inv} = (1/q) \bmod p;$$

$$h = (q_{Inv} \times (m_1 - m_2)) \bmod p; \text{ and}$$

$$m = m_2 + h \times q.$$

In this embodiment, the decryption parameters further include a preset first factor and second factor that are mutually prime, It should be understood by those skilled in the art that a product of the first factor and the second factor is n in the key (n, d), that is, n=p×q.

In this embodiment, the control component 202 is further configured to: receive a ciphertext set, and send a preprocessing signal including the ciphertext set to the preprocessing circuit, in response to that a bit width of a ciphertext in the ciphertext set is greater than a predetermined threshold, so that the preprocessing circuit performs the step 301 to perform parameter preprocessing.

In this embodiment, the preprocessing circuit unit 204 is configured to: read a decryption parameter from the memory in response to receiving the preprocessing signal, where the decryption parameter may include the first factor, the second factor, and the key; and perform an operation on the decryption parameter and the ciphertext whose bit width is greater than the predetermined threshold in the ciphertext set according to the Chinese remainder theorem, to determine intermediate parameters corresponding to the ciphertext whose bit width is greater than the predetermined threshold, where the intermediate parameters include a first base, a first exponent, a second base, and a second exponent.

The control component 202 is further configured to: monitor the preprocessing circuit, and determine whether there is an idle modular exponentiation circuit unit in the parallel processor, in response to detecting that the preprocessing circuit completes the task of determining the intermediate parameters corresponding to the ciphertext whose bit width is greater than the predetermined threshold.

The control component 202 is further configured to: send, in response to determining that there is an idle modular exponentiation circuit unit in the parallel processor, a first task transfer instruction to the preprocessing circuit unit and the idle modular exponentiation circuit unit, where the first task transfer instruction is used for transferring a decryption task of which preprocessing has been completed by the preprocessing circuit unit to the idle modular exponentiation circuit unit for executing a decryption process of the decryption task as described in step 302.

The preprocessing circuit unit 204 is further configured to: send the determined intermediate parameters corresponding to the ciphertext whose bit width is greater than the predetermined threshold to the idle modular exponentiation circuit unit, in response to receiving the first task transfer instruction, where the intermediate parameters include the first base, the first exponent, the second base, and the second exponent. After sending the determined intermediate parameters to the idle modular exponentiation circuit unit, the preprocessing circuit unit may perform preprocessing of a next decryption task.

The idle modular exponentiation circuit unit is further configured to: receive, in response to receiving the first task transfer instruction, the intermediate parameters sent by the preprocessing circuit unit, and perform the step 302 to perform a first modular exponentiation operation on the received first base, first exponent, and first factor and perform a second modular exponentiation operation on the received second base, second exponent, and second factor, to determine a first remainder and a second remainder. Herein, the first factor and the second factor received by the idle modular exponentiation circuit unit may be sent by the preprocessing circuit unit, or may be read by the idle modular exponentiation circuit unit from the memory.

The control component 202 is further configured to: monitor modular exponentiation circuit units in the parallel processor, determine whether the post-processing circuit unit is idle in response to detecting that there is a modular exponentiation circuit unit having completed the task of determining the first remainder and the second remainder in the parallel processor, and send a second task transfer instruction to the parallel processor and the post-processing circuit unit in response to determining that the post-processing circuit unit is idle.

The parallel processor 203 is further configured to: send the determined first remainder and second remainder, the first factor, and the second factor to the post-processing circuit unit in response to receiving the second task transfer instruction.

The post-processing circuit unit 205 is configured to: perform the step 303 to perform an operation on the first remainder, the second remainder, the first factor, and the second factor according to the Chinese remainder theorem to determine a plaintext corresponding to the ciphertext whose bit width is greater than the predetermined threshold, in response to receiving the second task transfer instruction, the first remainder, the second remainder, the first factor, and the second factor.

In some optional implementations of this embodiment, one preprocessing circuit unit and one post-processing circuit unit may be configured for a parallel processor including tens of modular exponentiation circuit units. Generally, the execution time for step 302 is tens of times that for step 301 or step 303. The configuration of one preprocessing circuit unit and one post-processing circuit unit for one parallel processor can avoid the redundant configuration of the preprocessing circuit unit and the post-processing circuit unit, and improve the resource utilization ratio.

This embodiment provides an RSA decryption processor. In the case of a ciphertext with a large bit width, a processor with a pipelining structure and including a preprocessing circuit unit, a parallel processor, and a post-processing circuit unit is provided. Such a processor with a pipelining structure can avoid the case that a next RSA decryption task cannot be started until step 301 to step 303 have all been completed. As shown in FIG. 2d, a schematic diagram illustrating pipelining execution of a decryption task by using the processor provided in this embodiment is illustrated, where tasks 0- to 3 respectively represent different tasks. Taking the task 0 as an example, "task 0" indicates the time progress of the task 0, "0-301" indicates the computational time needed to perform step 301 in the task 0, "0-302" indicates the computational time needed to perform step 302 in the task 0, and "0-303" indicates the computational time needed to perform step 303 in the task 0. As can be seen from FIG. 2d, the utilization ratio of circuit units are greatly improved, and the above-mentioned processor can execute in parallel multiple RSA decryption tasks, so that the throughput of the processor is increased, thereby improving the efficiency of RSA decryption in the case of large ciphertext bit width.

Figure 2C:
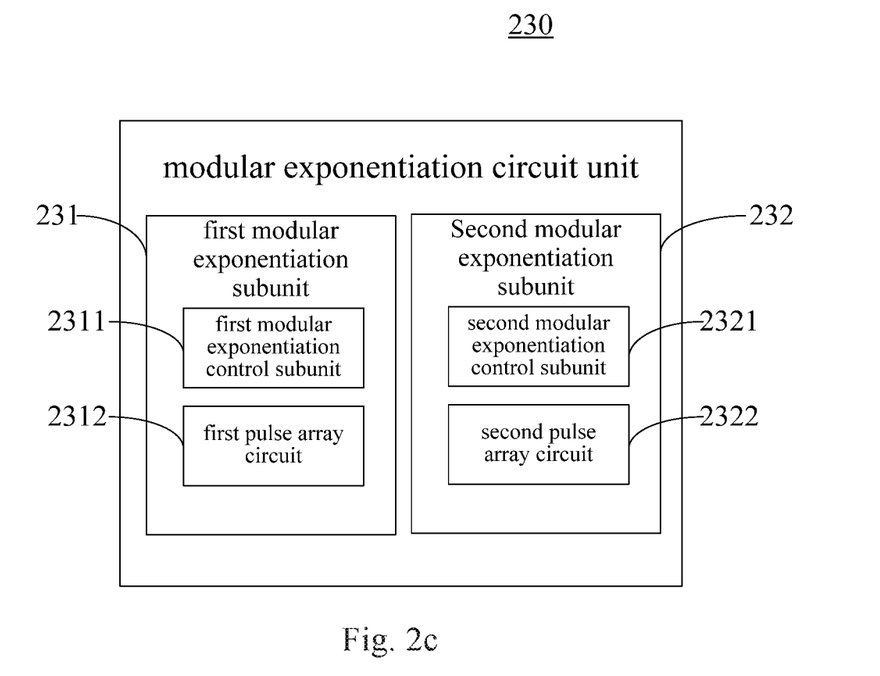
FIG. 2c is a schematic structural diagram of a modular exponentiation circuit unit according to the present application.
Figure 2D:
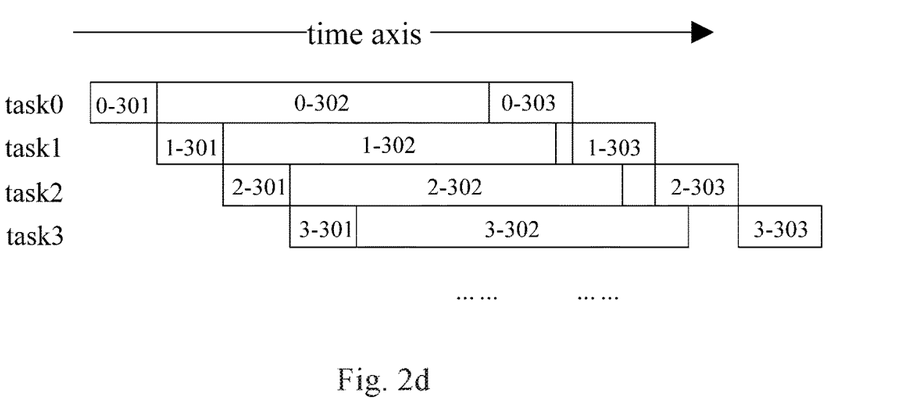
FIG. 2d is a schematic diagram illustrating pipelining execution of a decryption task by an RSA decryption processor according to the present application.

In some optional implementations of this embodiment, as shown in FIG. 2c, the structure of the modular exponentiation circuit unit 230 in the parallel processor is illustrated.

In this implementation, the modular exponentiation circuit unit 230 may include a first modular exponentiation subunit 231 and a second modular exponentiation subunit 232 that are in parallel. The first modular exponentiation subunit 231 is configured to perform the first modular exponentiation operation on the first base, the first exponent, and the first factor, to determine the first remainder. The second modular exponentiation subunit 232 is configured to perform the second modular exponentiation operation on the second base, the second exponent, and the second factor, to determine the second remainder.

In this implementation, the first modular exponentiation subunit 231 and the second modular exponentiation subunit 232 that are configured in parallel in the modular exponentiation circuit unit can execute in parallel the modular exponentiation operations shown in step 302. Compared with the prior art in which two modular exponentiation operations are serially executed, the parallelism of execution of step 302 is increased, thereby improving the efficiency of RSA decryption.

In this implementation, the first modular exponentiation subunit 231 includes a first modular exponentiation control subunit 2311 and a first pulse array circuit unit 2312. The first pulse array circuit unit is configured to perform a modular multiplication operation. The first modular exponentiation control subunit is configured to: call, according to the first base, the first exponent, and the first factor, the first pulse array circuit unit at least once to perform a modular multiplication operation, so as to complete the first modular exponentiation operation to determine the first remainder.

In this implementation, the second modular exponentiation subunit 232 includes a second modular exponentiation control subunit 2321 and a second pulse array circuit unit 2322. The second pulse array circuit unit is configured to perform a modular multiplication operation. The second modular exponentiation control subunit is configured to: call, according to the second base, the second exponent, and the second factor, the second pulse array circuit unit at least once to perform a modular multiplication operation, so as to complete the second modular exponentiation operation to determine the second remainder.

In this implementation, the first pulse array circuit unit and the second pulse array circuit unit respectively include a predetermined number of multiply-add operation units; and the modular exponentiation circuit unit that receives the intermediate parameters is further configured to: calculate a ratio of the number of multiply-add operation units in the first pulse array circuit unit to the first factor, to obtain a first ratio; calculate a ratio of the number of multiply-add operation units in the second pulse array circuit unit to the second factor, to obtain a second ratio; and incorporate at least one multiply-add operation unit in the pulse array circuit unit corresponding to the greater ratio into the pulse array circuit unit corresponding to the smaller ratio, in response to that the first ratio is not equal to the second ratio. Herein, the numbers of the multiply-add operation units in the first pulse array circuit unit and the second pulse array circuit unit may be the same or different.

As an example, when n in the private key has a bit width of 2048 bits, a sum of the bit widths of the first factor and the second factor is 2048 bits, but the respective bit widths of the first factor and the second factor cannot be determined. Set the number of multiply-add operation units in the first pulse array circuit unit as $a_1$, the number of multiply-add operation units in the second pulse array circuit unit as $a_2$, the bit width of the first factor as $b_1$, and the bit width of the second factor as $b_2$. In this case, the first ratio $r_1=a_1/b_1$, and the second ratio $r_2=a_2/b_2$. If $r_1>r_2$, at least one multiply-add operation unit in the first pulse array circuit unit is incorporated into the second pulse array circuit unit; $r_1<r_2$, at least one multiply-add operation unit in the second pulse array circuit unit is incorporated into the first pulse array circuit unit.

This implementation can improve the utilization ratio of computing resources by reasonably configuring the computing resources in the two pulse array circuit units of the modular exponentiation circuit unit.

Figure 4:
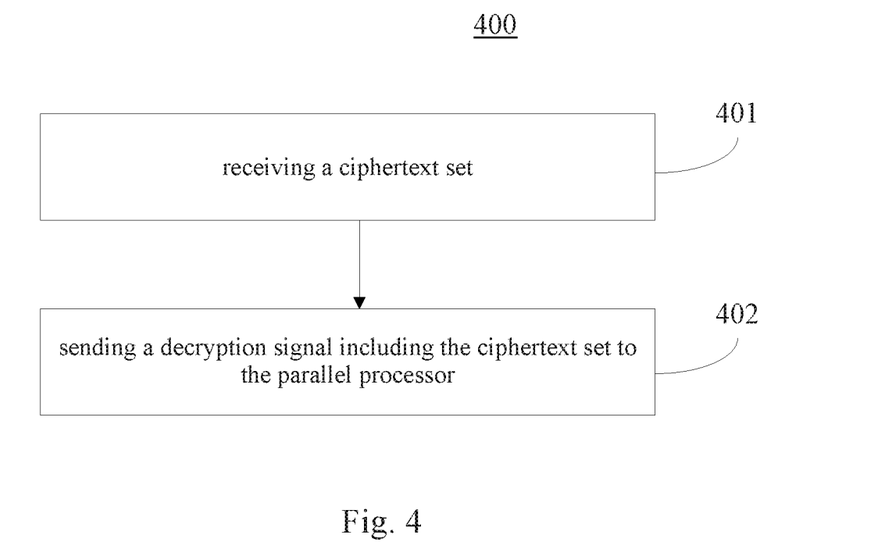
FIG. 4 is a flow chart of a method for controlling an RSA decryption processor according to an embodiment of the present application.

Referring to FIG. 4, a flow 400 of a method for controlling an RSA decryption processor according to an embodiment of the present application is illustrated. The RSA decryption processor includes a memory and a parallel processor, and the memory is configured to store decryption parameters including a private key. The flow 400 of the method for controlling an RSA decryption processor includes the following steps.

At step 401, a ciphertext set is received.

In this embodiment, an electronic device (for example, the control component in the dedicated processor 102 in FIG. 1) on which the method for controlling an RSA decryption processor runs may receive a ciphertext from another electronic device (for example, the general-purpose processor in FIG. 1). The another electronic device may be any electronic device that encrypts a plaintext to obtain a ciphertext and sends the obtained ciphertext, or may be an electronic device that forwards the ciphertext. Herein, the ciphertext set received by the control component is a set including at least one ciphertext.

At step 402, a decryption signal including the ciphertext set is sent to the parallel processor.

In this embodiment, after receiving the ciphertext set, the electronic device (for example, the control component in the dedicated processor 102 in FIG. 1) on which the method for controlling an RSA decryption processor runs may send a decryption signal to the parallel processor, where the decryption signal includes the ciphertext set received by the control component, so that the parallel processor reads a decryption parameter from the memory in response to receiving the decryption signal, and uses at least one modular exponentiation circuit unit in the parallel processor to perform in parallel a modular exponentiation operation on ciphertexts in the ciphertext set by using the read decryption parameter, to obtain plaintexts corresponding to the ciphertexts.

A large number of identical processing elements (PEs) may be configured in the parallel processor. They are interconnected in a way to form an array, and are controlled by a single control part to perform in parallel a same operation on different data respectively allocated thereto. In this embodiment, a large number of identical modular exponentiation circuit units may be configured in the parallel processor. Each modular exponentiation circuit unit separately perform a modular exponentiation operation on one ciphertext in the ciphertext set and the key, to obtain a plaintext through decryption.

Specific implementation of this embodiment and the technical effects achieved thereby can be referred to the related descriptions in the embodiment corresponding to FIG. 2a, and will not be repeatedly described here.

Figure 5:
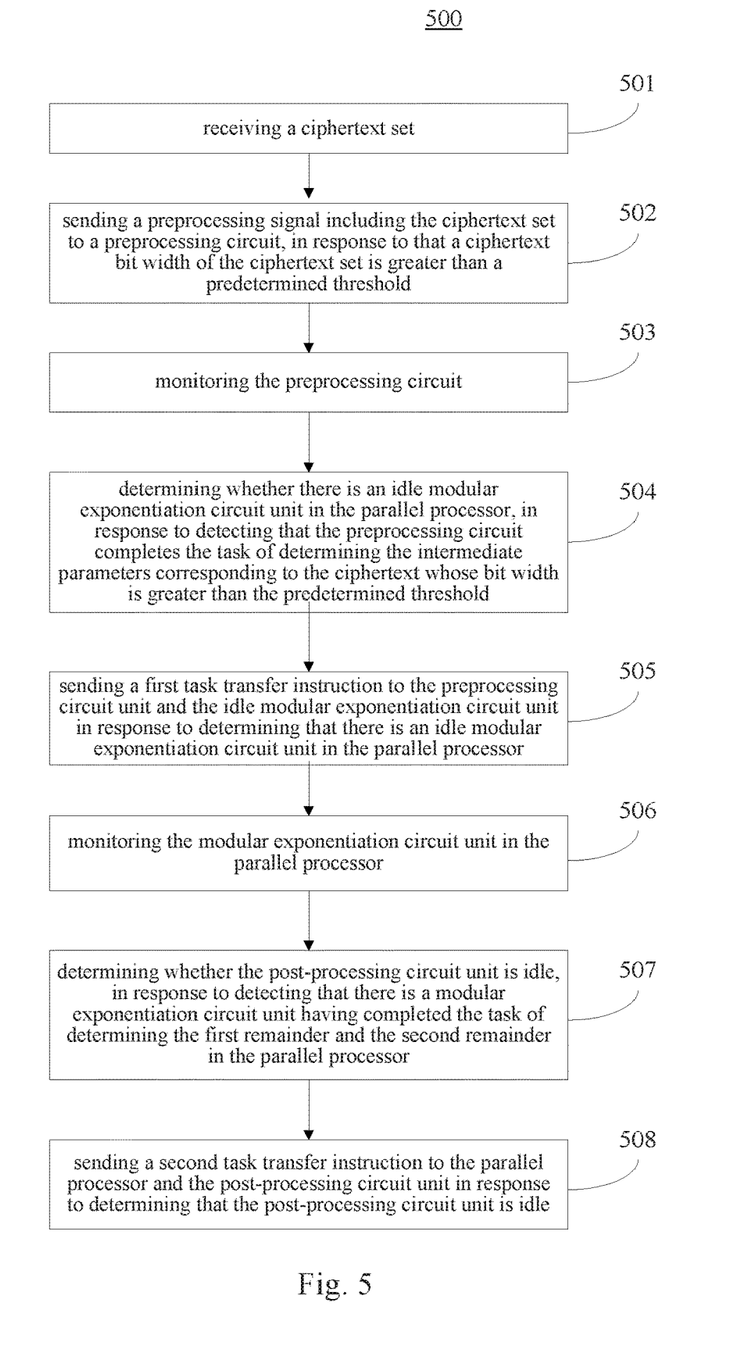
FIG. 5 is a flow chart of a method for controlling an RSA decryption processor according to another embodiment of the present application.

Referring to FIG. 5, a flow 500 of a method for controlling an RSA decryption processor according to another embodiment of the present application is illustrated. The flow 500 of the method for controlling an RSA decryption processor includes the following steps.

At step 501, a ciphertext set is received.

In this embodiment, an electronic device (for example, the control component in the dedicated processor 102 in FIG. 1) on which the method for controlling an RSA decryption processor runs may receive a ciphertext from another electronic device (for example, the general-purpose processor in FIG. 1).

At step 502, a preprocessing signal including the ciphertext set is sent to a preprocessing circuit, in response to that a bit width of a ciphertext in the ciphertext set is greater than a predetermined threshold.

In this embodiment, the electronic device (for example, the control component in the dedicated processor 102 in FIG. 1) on which the method for controlling an RSA decryption processor runs may send a preprocessing signal including the ciphertext set to the preprocessing circuit, in response to that a bit width of a ciphertext in the ciphertext set is greater than a predetermined threshold, so that the preprocessing circuit performs the step 301 to perform parameter preprocessing.

At step 503, the preprocessing circuit is monitored.

In this embodiment, the electronic device (for example, the control component in the dedicated processor 102 in FIG. 1) on which the method for controlling an RSA decryption processor runs may monitor the preprocessing circuit.

At step 504, it is determined whether there is an idle modular exponentiation circuit unit in the parallel processor, in response to detecting that the preprocessing circuit completes the task of determining the intermediate parameters corresponding to the ciphertext whose bit width is greater than the predetermined threshold.

In this embodiment, the electronic device (for example, the control component in the dedicated processor 102 in FIG. 1) on which the method for controlling an RSA decryption processor runs may determine whether there is an idle modular exponentiation circuit unit in the parallel processor, in response to detecting that the preprocessing circuit completes the task of determining the intermediate parameters corresponding to the ciphertext whose bit width is greater than the predetermined threshold.

At step 505, in response to determining that there is an idle modular exponentiation circuit unit in the parallel processor, a first task transfer instruction is sent to the preprocessing circuit unit and the idle modular exponentiation circuit unit.

In this embodiment, the electronic device (for example, the control component in the dedicated processor 102 in FIG. 1) on which the method for controlling an RSA decryption processor runs may send the determined intermediate parameters corresponding to the ciphertext whose bit width is greater than the predetermined threshold to the idle modular exponentiation circuit unit, in response to receiving the first task transfer instruction. After sending the determined intermediate parameters to the idle modular exponentiation circuit unit, the preprocessing circuit unit may perform preprocessing of a next decryption task.

At step 506, modular exponentiation circuit units in the parallel processor are monitored.

In this embodiment, the electronic device (for example, the control component in the dedicated processor 102 in FIG. 1) on which the method for controlling an RSA decryption processor runs may monitor modular exponentiation circuit units in the parallel processor.

At step 507, it is determined whether the post-processing circuit unit is idle, in response to detecting that there is a modular exponentiation circuit unit having completed the task of determining the first remainder and the second remainder in the parallel processor.

In this embodiment, the electronic device (for example, the control component in the dedicated processor 102 in FIG. 1) on which the method for controlling an RSA decryption processor runs may determine whether the post-processing circuit unit is idle, in response to detecting that there is a modular exponentiation circuit unit having completed the task of determining the first remainder and the second remainder in the parallel processor.

At step 508, a second task transfer instruction is sent to the parallel processor and the post-processing circuit unit in response to determining that the post-processing circuit unit is idle.

In this embodiment, the electronic device (for example, the control component in the dedicated processor 102 in FIG. 1) on which the method for controlling an RSA decryption processor runs may send a second task transfer instruction to the parallel processor and the post-processing circuit unit in response to determining that the post-processing circuit unit is idle, so that the parallel processor sends the determined first remainder and second remainder, the first factor, and the second factor to the post-processing circuit unit in response to receiving the second task transfer instruction, and the post-processing circuit unit performs an operation on the first remainder, the second remainder, the first factor, and the second factor according to the Chinese remainder theorem to determine a plaintext corresponding to the ciphertext whose bit width is greater than the predetermined threshold, in response to receiving the second task transfer instruction, the first remainder, the second remainder, the first factor, and the second factor.

Specific implementation of the method for controlling an RSA decryption processor that is provided in this embodiment and the technical effects achieved thereby can be referred to the related descriptions in the embodiments corresponding to FIG. 2b-FIG. 2d and FIG. 3, and will not be repeatedly described here.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The devices involved in the embodiments of the present disclosure may be implemented by way of software or hardware. The described devices may also be provided in a processor, for example, described as: a processor, comprising a memory, a control component and a parallel processor, where the names of these devices are not considered as a limitation to the devices. For example, the memory may also be described as "a device for storing decryption parameters".

In another aspect, the present disclosure further provides a non-transitory computer storage medium. The non-transitory computer storage medium may be the non-transitory computer storage medium included in the apparatus in the above embodiments, or a stand-alone non-transitory computer storage medium which has not been assembled into the apparatus. The non-transitory computer storage medium stores one or more programs. The one or more programs, when executed by a device, cause the device to: receive a ciphertext set, and send a decryption signal comprising the ciphertext set to the parallel processor.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An RSA decryption processor, comprising a memory, a control component, a preprocessing circuit unit and a parallel processor, wherein
    the memory is configured to store decryption parameters comprising a private key, and a preset first factor and second factor prime with each other;
    the control component is configured to receive a ciphertext set, send a preprocessing signal comprising the ciphertext set to the preprocessing circuit unit, in response to that a ciphertext bit width of the ciphertext set is greater than a predetermined threshold, and send a decryption signal comprising the ciphertext set to the parallel processor in response to that the ciphertext bit width of the ciphertext set is not greater than the predetermined threshold;
    the preprocessing circuit unit is configured to: read a decryption parameter from the memory in response to receiving the preprocessing signal, and perform an operation on the decryption parameter and a ciphertext whose bit width is greater than the predetermined threshold in the ciphertext set according to the Chinese remainder theorem, to determine intermediate parameters corresponding to the ciphertext whose bit width is greater than the predetermined threshold, wherein the intermediate parameters comprise a first base, a first exponent, a second base, and a second exponent;
    the control component is further configured to: monitor the preprocessing circuit unit, and determine whether a modular exponentiation circuit unit in the parallel processor is idle, in response to detecting that the preprocessing circuit unit completes determining the intermediate parameters corresponding to the ciphertext whose bit width is greater than the predetermined threshold; and
    the parallel processor is configured to: read a decryption parameter from the memory in response to receiving the decryption signal, and use at least one modular exponentiation circuit unit in the parallel processor to perform in parallel a modular exponentiation operation on ciphertexts in the ciphertext set by using the read decryption parameter, to obtain plaintexts corresponding to the ciphertexts.

2. The RSA decryption processor according to claim 1, wherein
    the control component is further configured to: send a first task transfer instruction to the preprocessing circuit unit and the idle modular exponentiation circuit unit, in response to determining that a modular exponentiation circuit unit in the parallel processor is idle;
    the preprocessing circuit unit is further configured to: send the determined intermediate parameters corresponding to the ciphertext whose bit width is greater than the predetermined threshold to the idle modular exponentiation circuit unit, in response to receiving the first task transfer instruction; and
    the idle modular exponentiation circuit unit is further configured to: receive the intermediate parameters sent from the preprocessing circuit unit in response to receiving the first task transfer instruction, and perform a first modular exponentiation operation on the received first base, first exponent, and first factor and perform a second modular exponentiation operation on the received second base, second exponent, and second factor, to determine a first remainder and a second remainder.

3. The RSA decryption processor according to claim 2, further comprising a post-processing circuit unit, wherein
    the control component is further configured to: monitor the modular exponentiation circuit unit in the parallel processor, determine whether the post-processing circuit unit is idle in response to detecting that a modular exponentiation circuit unit in the parallel processor has determined the first remainder and the second remainder, and send a second task transfer instruction to the parallel processor and the post-processing circuit unit in response to determining that the post-processing circuit unit is idle;
    the parallel processor is further configured to: send the determined first remainder and second remainder, the first factor, and the second factor to the post-processing circuit unit in response to receiving the second task transfer instruction; and
    the post-processing circuit unit is configured to: perform an operation on the first remainder, the second remainder, the first factor, and the second factor according to the Chinese remainder theorem to determine a plaintext corresponding to the ciphertext whose bit width is greater than the predetermined threshold, in response to receiving the second task transfer instruction, the first remainder, the second remainder, the first factor, and the second factor.

4. The RSA decryption processor according to claim 1, wherein the modular exponentiation circuit unit receiving the intermediate parameters comprises a first modular exponentiation subunit and a second modular exponentiation subunit in parallel,
    the first modular exponentiation subunit is configured to perform a first modular exponentiation operation on the first base, the first exponent, and the first factor, to determine the first remainder; and
    the second modular exponentiation subunit is configured to perform a second modular exponentiation operation on the second base, the second exponent, and the second factor, to determine the second remainder.

5. The RSA decryption processor according to claim 4, wherein the first modular exponentiation subunit comprises a first modular exponentiation control subunit and a first pulse array circuit unit, the first pulse array circuit unit is configured to perform a modular multiplication operation; and the first modular exponentiation control subunit is configured to: call the first pulse array circuit unit at least once to perform a modular multiplication operation according to the first base, the first exponent, and the first factor, so as to complete the first modular exponentiation operation to determine the first remainder.

6. The RSA decryption processor according to claim 5, wherein the second modular exponentiation subunit comprises a second modular exponentiation control subunit and a second pulse array circuit unit, the second pulse array circuit unit is configured to perform a modular multiplication operation; and the second modular exponentiation control subunit is configured to: call the second pulse array circuit unit at least once to perform a modular multiplication operation according to the second base, the second exponent, and the second factor, so as to complete the second modular exponentiation operation to determine the second remainder.

7. The RSA decryption processor according to claim 6, wherein each of the first pulse array circuit unit and the second pulse array circuit unit comprises a predetermined number of multiply-add operation units; and the modular exponentiation circuit unit receiving the intermediate parameters is further configured to: calculate a ratio of the number of multiply-add operation units in the first pulse array circuit unit to the first factor to obtain a first ratio, calculate a ratio of the number of multiply-add operation units in the second pulse array circuit unit to the second factor to obtain a second ratio, and incorporate at least one multiply-add operation unit in the pulse array circuit unit corresponding to the greater ratio into the pulse array circuit unit corresponding to the smaller ratio, in response to that the first ratio is not equal to the second ratio.

8. A method for controlling an RSA decryption processor, wherein the RSA decryption processor comprises a memory, a preprocessing circuit unit and a parallel processor, the memory is configured to store decryption parameters comprising a private key, and a preset first factor and second factor prime with each other, and the method comprises:

receiving a ciphertext set;

sending a preprocessing signal comprising the ciphertext set to the preprocessing circuit unit, in response to that a ciphertext bit width of the ciphertext set is greater than a predetermined threshold, so that the preprocessing circuit unit reads a decryption parameter from the memory in response to receiving the preprocessing signal, and performs an operation on the decryption parameter and a ciphertext whose bit width is greater than the predetermined threshold in the ciphertext set according to the Chinese remainder theorem, to determine intermediate parameters corresponding to the ciphertext whose bit width is greater than the predetermined threshold, wherein the intermediate parameters comprise a first base, a first exponent, a second base, and a second exponent; sending a decryption signal comprising the ciphertext set to the parallel processor in response to that the ciphertext bit width of the ciphertext set is not greater than the predetermined threshold, so that the parallel processor reads a decryption parameter from the memory in response to receiving the decryption signal, and uses at least one modular exponentiation circuit unit in the parallel processor to perform in parallel a modular exponentiation operation on ciphertexts in the ciphertext set by using the read decryption parameter, to obtain plaintexts corresponding to the ciphertexts;

monitoring the preprocessing circuit unit; and determining whether a modular exponentiation circuit unit in the parallel processor is idle, in response to detecting that the preprocessing circuit unit completes determining the intermediate parameters corresponding to the ciphertext whose bit width is greater than the predetermined threshold.

9. The method according to claim 8, further comprising:

sending a first task transfer instruction to the preprocessing circuit unit and the idle modular exponentiation circuit unit, in response to determining that a modular exponentiation circuit unit in the parallel processor is idle, so that the preprocessing circuit unit sends the determined intermediate parameters corresponding to the ciphertext whose bit width is greater than the predetermined threshold to the idle modular exponentiation circuit unit, in response to receiving the first task transfer instruction, and so that the idle modular exponentiation circuit unit receives the intermediate parameters sent from the preprocessing circuit unit in response to receiving the first task transfer instruction, and performs a first modular exponentiation operation on the received first base, first exponent, and first factor and performs a second modular exponentiation operation on the received second base, second exponent, and second factor, to determine a first remainder and a second remainder.

10. The method according to claim 9, further comprising:

monitoring the modular exponentiation circuit unit in the parallel processor;

determining whether the post-processing circuit unit is idle in response to detecting that a modular exponentiation circuit unit in the parallel processor has determined the first remainder and the second remainder; and sending a second task transfer instruction to the parallel processor and the post-processing circuit unit in response to determining that the post-processing circuit unit is idle, so that the parallel processor sends the determined first remainder and second remainder, the first factor, and the second factor to the post-processing circuit unit in response to receiving the second task transfer instruction, and so that the post-processing circuit unit performs an operation on the first remainder, the second remainder, the first factor, and the second factor according to the Chinese remainder theorem to determine a plaintext corresponding to the ciphertext whose bit width is greater than the predetermined threshold, in response to receiving the second task transfer instruction, the first remainder, the second remainder, the first factor, and the second factor.

11. A non-transitory storage medium storing one or more programs, the one or more programs when executed by an apparatus, causing the apparatus to perform operations for controlling an RSA decryption processor, wherein the RSA decryption processor comprises a memory, a preprocessing circuit unit and a parallel processor, the memory is configured to store decryption parameters comprising a private key, and a preset first factor and second factor prime with each other, and the operations comprise:

receiving a ciphertext set;

sending a preprocessing signal comprising the ciphertext set to the preprocessing circuit unit, in response to that a ciphertext bit width of the ciphertext set is greater than a predetermined threshold, so that the preprocessing circuit unit reads a decryption parameter from the memory in response to receiving the preprocessing signal, and performs an operation on the decryption parameter and a ciphertext whose bit width is greater than the predetermined threshold in the ciphertext set according to the Chinese remainder theorem, to determine intermediate parameters corresponding to the ciphertext whose bit width is greater than the predetermined threshold, wherein the intermediate parameters comprise a first base, a first exponent, a second base, and a second exponent; sending a decryption signal comprising the ciphertext set to the parallel processor in response to that the ciphertext bit width of the ciphertext set is not greater than the predetermined threshold, so that the parallel processor reads a decryption parameter from the memory in response to receiving the decryption signal, and uses at least one modular exponentiation circuit unit in the parallel processor to perform in parallel a modular exponentiation operation on ciphertexts in the ciphertext set by using the read decryption parameter, to obtain plaintexts corresponding to the ciphertexts;

monitoring the preprocessing circuit unit; and determining whether a modular exponentiation circuit unit in the parallel processor is idle, in response to detecting that the preprocessing circuit unit completes determining the intermediate parameters corresponding to the ciphertext whose bit width is greater than the predetermined threshold.

12. The non-transitory storage medium according to claim 11, wherein the operations further comprise:

sending a first task transfer instruction to the preprocessing circuit unit and the idle modular exponentiation circuit unit, in response to determining that a modular exponentiation circuit unit in the parallel processor is idle, so that the preprocessing circuit unit sends the determined intermediate parameters corresponding to the ciphertext whose bit width is greater than the predetermined threshold to the idle modular exponentiation circuit unit, in response to receiving the first task transfer instruction, and so that the idle modular exponentiation circuit unit receives the intermediate parameters sent from the preprocessing circuit unit in response to receiving the first task transfer instruction, and performs a first modular exponentiation operation on the received first base, first exponent, and first factor and performs a second modular exponentiation operation on the received second base, second exponent, and second factor, to determine a first remainder and a second remainder.

13. The non-transitory storage medium according to claim 12, wherein the operations further comprise:

monitoring the modular exponentiation circuit unit in the parallel processor;

determining whether the post-processing circuit unit is idle in response to detecting that a modular exponentiation circuit unit in the parallel processor has determined the first remainder and the second remainder; and sending a second task transfer instruction to the parallel processor and the post-processing circuit unit in response to determining that the post-processing circuit unit is idle, so that the parallel processor sends the determined first remainder and second remainder, the first factor, and the second factor to the post-processing circuit unit in response to receiving the second task transfer instruction, and so that the post-processing circuit unit performs an operation on the first remainder, the second remainder, the first factor, and the second factor according to the Chinese remainder theorem to determine a plaintext corresponding to the ciphertext whose bit width is greater than the predetermined threshold, in response to receiving the second task transfer instruction, the first remainder, the second remainder, the first factor, and the second factor.

* * * * *